(12) United States Patent
Grechanik

(10) Patent No.: US 9,256,422 B2
(45) Date of Patent: Feb. 9, 2016

(54) SYSTEMS AND METHODS FOR FINDING PROJECT-RELATED INFORMATION BY CLUSTERING APPLICATIONS INTO RELATED CONCEPT CATEGORIES

(71) Applicant: ACCENTURE GLOBAL SERVICES LIMITED, Dublin (IE)

(72) Inventor: Mark Grechanik, Chicago, IL (US)

(73) Assignee: Accenture Global Services Limited, Dublin (IE)

( * ) Notice: Subject to any disclaimer, the term of this patent is extended or adjusted under 35 U.S.C. 154(b) by 0 days.

(21) Appl. No.: 14/452,433

(22) Filed: Aug. 5, 2014

(65) Prior Publication Data

US 2014/0344783 A1    Nov. 20, 2014

Related U.S. Application Data

(63) Continuation of application No. 13/248,877, filed on Sep. 29, 2011, now Pat. No. 8,832,655.

(51) Int. Cl.
| | |
|---|---|
| *G06F 19/00* | (2011.01) |
| *G06F 17/00* | (2006.01) |
| *G06F 9/44* | (2006.01) |
| *G06F 7/00* | (2006.01) |
| *G06F 17/30* | (2006.01) |
| *G06F 11/00* | (2006.01) |
| *G06F 17/28* | (2006.01) |
| *G06F 9/46* | (2006.01) |
| *G06F 3/00* | (2006.01) |

(52) U.S. Cl.
CPC ... *G06F 8/70* (2013.01); *G06F 8/71* (2013.01)

(58) Field of Classification Search
CPC ............ G06F 11/3419; G06F 11/3447; G06F 11/3466; G06F 11/3404; G06F 17/30539; G06F 17/30985; G06F 17/3069; G06F 17/30327; G06F 17/30333; G06F 17/3071; G06F 17/30997; G06F 17/30707
See application file for complete search history.

(56) References Cited

U.S. PATENT DOCUMENTS

| | | | |
|---|---|---|---|
| 5,590,329 A | 12/1996 | Goodnow et al. | |
| 5,778,362 A * | 7/1998 | Deerwester | 706/50 |
| 5,907,709 A | 5/1999 | Cantey et al. | |
| 5,931,907 A * | 8/1999 | Davies et al. | 715/260 |
| 6,151,703 A | 11/2000 | Crelier | |
| 6,259,958 B1 | 7/2001 | Steinman et al. | |

(Continued)

OTHER PUBLICATIONS

Bajracharya et al., "Leveraging Usage Similarity for Effective Retrieval of Examples in Code Repositories," In Proceedings of the Eighteenth ACM Sigsoft International Symposium on Foundations of Software Engineering (FSE '10), 2010, pp. 157-166. ACM: New York, NY, USA.

(Continued)

*Primary Examiner* — Don Wong
*Assistant Examiner* — Anibal Rivera
(74) *Attorney, Agent, or Firm* — Harrity & Harrity, LLP

(57) ABSTRACT

A system, method, and computer-readable medium, is described that finds similarities among programming applications based on semantic anchors found within the source code of such applications. The semantic anchors may be API calls, such as Java's package and class calls of the JDK. Latent Semantic Indexing may be used to process the application and semantic anchor data and automatically develop a similarity matrix that contains numbers representing the similarity of one program to another.

20 Claims, 7 Drawing Sheets

(56) References Cited

U.S. PATENT DOCUMENTS

| | | | |
|---|---|---|---|
| 6,289,337 B1* | 9/2001 | Davies et al. | 715/267 |
| 6,615,208 B1* | 9/2003 | Behrens et al. | 707/754 |
| 7,113,943 B2 | 9/2006 | Bradford et al. | |
| 7,200,837 B2 | 4/2007 | Stevens | |
| 7,689,979 B1 | 3/2010 | Sawyer et al. | |
| 7,716,229 B1* | 5/2010 | Srivastava et al. | 707/749 |
| 7,783,640 B2 | 8/2010 | Liao et al. | |
| 7,802,236 B2 | 9/2010 | Calder et al. | |
| 7,870,133 B2 | 1/2011 | Krishnamoorthy et al. | |
| 2002/0032682 A1 | 3/2002 | Kobayashi et al. | |
| 2002/0103799 A1 | 8/2002 | Bradford et al. | |
| 2004/0111708 A1* | 6/2004 | Calder et al. | 717/131 |
| 2005/0114325 A1 | 5/2005 | Liu et al. | |
| 2005/0166115 A1* | 7/2005 | Daume et al. | 714/741 |
| 2006/0047441 A1 | 3/2006 | Homayouni et al. | |
| 2006/0130021 A1 | 6/2006 | Plum et al. | |
| 2006/0259481 A1 | 11/2006 | Handley | |
| 2007/0076936 A1* | 4/2007 | Li et al. | 702/20 |
| 2007/0157166 A1 | 7/2007 | Stevens | |
| 2007/0168949 A1 | 7/2007 | Shattuck et al. | |
| 2007/0179924 A1 | 8/2007 | Zhong et al. | |
| 2007/0185868 A1 | 8/2007 | Roth et al. | |
| 2007/0185871 A1* | 8/2007 | Canright et al. | 707/7 |
| 2008/0189232 A1* | 8/2008 | Dunning et al. | 706/45 |
| 2009/0138898 A1* | 5/2009 | Grechanik et al. | 719/328 |
| 2009/0182730 A1 | 7/2009 | Krishnamoorthy et al. | |
| 2009/0228453 A1 | 9/2009 | Hirsch et al. | |
| 2009/0282393 A1 | 11/2009 | Costa et al. | |
| 2009/0307208 A1* | 12/2009 | Peng et al. | 707/5 |
| 2009/0313282 A1* | 12/2009 | Bhagwan et al. | 707/102 |
| 2010/0114890 A1* | 5/2010 | Hagar et al. | 707/737 |
| 2010/0262454 A1* | 10/2010 | Sommer et al. | 706/55 |
| 2010/0293166 A1* | 11/2010 | Hatami-Hanza | 707/737 |
| 2011/0258196 A1* | 10/2011 | Lepsoy et al. | 707/741 |
| 2011/0270883 A1 | 11/2011 | Bukai et al. | |
| 2012/0179682 A1 | 7/2012 | De Saeger et al. | |

OTHER PUBLICATIONS

Cubranic et al., "Hipikat: Recommending Pertinent Software Development Artifacts," Proceedings of the 25th International Conference on Software Engineering (ICSE '03), 2003, pp. 408-418.

Kawaguchi at al., "MUDABlue: An Automatic Categorization System for Open Source Repositories," In Proceedings of the 11th Asia-Pacific Software Engineering Conference (APSEC.04), 2004, pp. 184-193.

Kawaguchi et al., "MUDABlue: An Automatic Categorization System for Open Source Repositories," The Journal of Systems and Software, 2006, vol. 79, pp. 939-953.

Michail et al., "Assessing Software Libraries by Browsing Similar Classes, Functions, and Relationships," Proceedings of the 1999 International Conference on Software Engineering, 1999, pp. 463-472.

Mizzaro, "Relevance: The Whole History," Journal of the American Society for Information Science, 1997, vol. 43, pp. 810-832.

Mizzaro, "How Many Relevances in information Retrieval?" interacting with Computers, 1998, vol. 10, pp. 305-322.

Schuler et al., "A Dynamic Birthmark for Java," Proceedings of the Twenty-Second IEEE/ACM International Conference on Automated Software Engineering (ASE '07), 2007, pp. 274-283.

Ye et al., "Supporting Reuse by Delivering Task-Relevant and Personalized Information," Proceedings of 2002 International Conference on Software Engineering (ICSE'02), 2002, pp. 513-523.

Jiang et al., "Traceabiilty Link Evolution Management with Incremental Latent Semantic Indexing", 2007 IEEE (retrieved on Feb. 3, 2014 from internet: <URL:http://ieeexplore.ieee.org/stamp/stamp.jsp?tp=&arnumber=4291019> 8 pages (1-8).

McMillan et al., Recommending Source Code Examples via API Call Usages and Documentation, ACM 978-1-60558-974-9, May 2-8, 2010; retrieved on May 30, 2013 from Internet: <URL:http://www.cse.nd.edu/~cmc/papers/cmc_rsse10_cameraready_final.pdf> 5 pages (1-5).

* cited by examiner

SYSTEMS AND METHODS FOR FINDING PROJECT-RELATED INFORMATION BY CLUSTERING APPLICATIONS INTO RELATED CONCEPT CATEGORIES

RELATED APPLICATIONS

This application is a continuation of application Ser. No. 13/248,877, filed Sep. 29, 2011, which is incorporated herein by reference in its entirety to provide continuity of disclosure.

TECHNICAL FIELD

This disclosure relates generally to the classification and searching of software applications.

BACKGROUND

Retrieving similar or related web pages is a feature of popular search engines (e.g., Google, Ask.com, HotBot). For example, after a user submits a search query, Google displays links to relevant web pages along with a link labeled "Similar" next to each result. These "Similar" links point to web pages that Google's algorithm judges to be similar by aggregating various factors that may include target link association (as when one webpage contains links to each of the "Similar" web pages), topical similarities, and popularity scores of the retrieved pages. One benefit of the "Similar" link is that it lets users find pages similar to a known web page without the need to determine the proper keyword search to achieve this result.

One technical area where a similarity search function would be desirable is in the realm of application development. A software application is a collection of all source code modules, libraries, and programs that, when compiled, result in the final deliverable that customers install and use to accomplish certain business functions. Detecting similarity between applications, however, is a notoriously difficult problem, in part because it means automatically detecting that the high-level requirements of these applications match semantically. Such detection is difficult for a variety of reasons. For example, many application repositories are polluted with poorly functioning projects, which could lead to non-functioning projects being misidentified as "similar" to functioning projects. Further, keyword searching may also lead to erroneous results because, for example, a keyword match between words in a requirements document with words in the descriptions or source code of an application does not guarantee relevance between the two corresponding applications. Also, applications may be highly similar to one another at a low-level even if they do not perform the same high-level functionality, which could result in the misidentification of "similar" applications that perform dissimilar functions. Moreover, it may be difficult to recognize similarity between software artifacts belonging to different applications because programmers rarely record traceability links between different applications.

Knowing similarity between applications plays an important role in assessing reusability of applications, improving understanding of source code, prototyping for rapid development, and discovering code theft and plagiarism. Allowing programmers to compare how different applications implement the same requirements may contribute to their knowledge about application requirements and to the efficient reuse of code. Retrieving a list of similar applications may allow programmers to concentrate on the new aspects of the requirements, thus saving time and resources for programmers. Programmers could spend this time instead understanding the functionality of similar applications, and seeing the complete context in which the functionality is used.

Consider a typical project in a large-scale software development enterprise in which company programmers engage in several hundred software projects at the same time. The enterprise may have previously delivered thousands of applications, many of which may have had similar requirements and implementations to the project at hand.

A typical project starts with writing a proposal in response to a bid request from a company that needs an application. A winning bid proposal has many components: well-written requirements, preliminary models and design documents, and proof of experience in building and delivering similar applications in the past. A company that submits a bid proposal that contains these components with the closest correlation to a desired application will likely win the bid. Reusing the components from successfully delivered applications in the past will save time and resources and further increase chances of winning the bid. Thus, recognizing similarities between past and present applications is important for preserving knowledge, leveraging experience, winning bids on future projects, and successfully building new applications.

The process of finding similar applications may start with code search engines that return code fragments and documents in response to queries that contain key words from elicited requirements. However, returned code fragments are of little help when many other non-code artifacts (e.g., different functional and non-functional requirements documents, UML models, or design documents) are required. Matching words in queries against words in documents and source code may be a good starting point, but keyword search results do not establish how applications are similar at a high-level scale.

A problem in detecting closely related applications is in the mismatch between the high-level intent reflected in the descriptions of these applications and low-level details of the implementation. This problem is known as the concept assignment problem. For any two applications it is too imprecise to establish their similarity by simply matching words in the descriptions of the applications, comments in their source code, and the names of program variables and types (e.g., names of classes and functions as well as identifiers). Thus, existing code search engines do not effectively detect similar applications and programmers must typically invest a significant intellectual effort to analyze and understand the functional similarity of retrieved applications.

Similarities between documents can be found using syntagmatic associations by considering documents similar when terms in these documents occur together in each document. This technique is used by the MUDABlue similarity engine. Alternatively, similarities between documents can be found using semantic anchors and by developing paradigmatic associations where documents contain terms with high semantic similarities. Semantic anchors are elements of documents that precisely define the documents' semantic characteristics. Semantic anchors may take many forms. For example, they can be expressed as links to web sites that have high integrity and well-known semantics (e.g., cnn.com or whitehouse.gov) or they can refer to elements of semantic ontologies that are precisely defined and agreed upon by different stakeholders. Without semantic anchors, documents (or applications) are considered as collections of words with no semantics, and the relevance of these documents to user queries (and to one another) is determined by matches between words. Using semantics represents the essence of paradigmatic associations between documents, whereas using word matching represents the essence of syntagmatic associations.

Programmers routinely use Application Programming Interface (API) calls from third-party packages (e.g., the Java Development Kit (JDK)) to implement various requirements. Unlike names of program variables, types, and words used in comments, API calls from well-known and widely used libraries have precisely defined semantics. Since programs contain API calls with precisely defined semantics, the API calls may serve as semantic anchors to compute the degree of similarity between applications by matching the semantics of applications as expressed by the API calls. Using the API calls to compute similarities among applications may result in better precision than syntagmatic associations among applications.

Therefore, a method of finding similarities in applications based on underlying semantics of the applications would be useful to allow programmers needing to find similar applications to do so with less intellectual and manual efforts than currently used search methods. A method of finding a similar application based on underlying semantics would also be useful to help preserve knowledge base and correlate supporting software documentation in similar applications.

SUMMARY

A method, system, and computer readable medium are described where the method receives, by a computer, source code for a plurality of applications and associates each application to semantic anchors found with each application. The method, system, and computer-readable medium also compare the applications based on the semantic anchors and assign, based on the comparison, a similarity index, representing the similarity between two applications.

It is to be understood that both the foregoing general description and the following detailed description are exemplary and explanatory only and are not restrictive of the application, as claimed.

The accompanying drawings, which are incorporated in and constitute a part of this specification, illustrate several embodiments of the application and together with the description, serve to explain the principles of the application.

DETAILED DESCRIPTION

Reference will now be made in detail to the exemplary embodiments. Wherever possible, the same reference numbers will be used throughout the drawings to refer to the same or like parts.

Embodiments consistent with the present disclosure may use semantic anchors and dependencies among such semantic anchors to compute similarities between documents with a higher degree of accuracy when compared with results obtained with documents that have no commonly defined semantic anchors. This approach is based on three observations. First, if two applications share some semantic anchors (e.g., API calls), then their similarity index should be higher than for applications that do not share any semantic anchors. Sharing semantic anchors means more than the exact syntactic match between two API calls; it also means that two different API calls will match semantically if they come from the same class or a package. This idea is rooted in the fact that classes and packages in the JDK contain semantically related API calls; for example, the java.security package contains classes and API calls that enable programmers to implement security-related requirements, and the java.util.zip package exports classes that contain API calls for reading and writing the standard ZIP and GZIP file formats. The exemplary process may thus exploit relationships between inheritance hierarchies in JDK to improve the precision of computing similarity.

Second, different API calls have different weights. Many applications have many API calls that deal with collections and string manipulations. The exemplary process automatically assigns higher weights to API calls that are encountered in fewer applications and, conversely to assign lower weights to API calls that are encountered in a majority of applications. There is no need to know what API calls are used in the applications—this task may be done automatically, improving the precision of the process by preventing API calls to common packages like java.lang from skewing the similarity index.

Third, an application requirement is often implemented using combinations of different API calls rather than a single API call, meaning that co-occurrences of API calls in different applications may form a pattern indicating that these applications implement similar requirements. For example, a requirement for efficiently and securely exchanging XML data is often implemented using API calls that read XML data from a file, compress and encrypt it, and then send this data over a network. Even though different ways of implementing this requirement are possible, the patterns of co-occurrences of these API calls may be reflected in the similarity index, thus improving the precision of the results when compared with alternative approaches.

Figure 1:
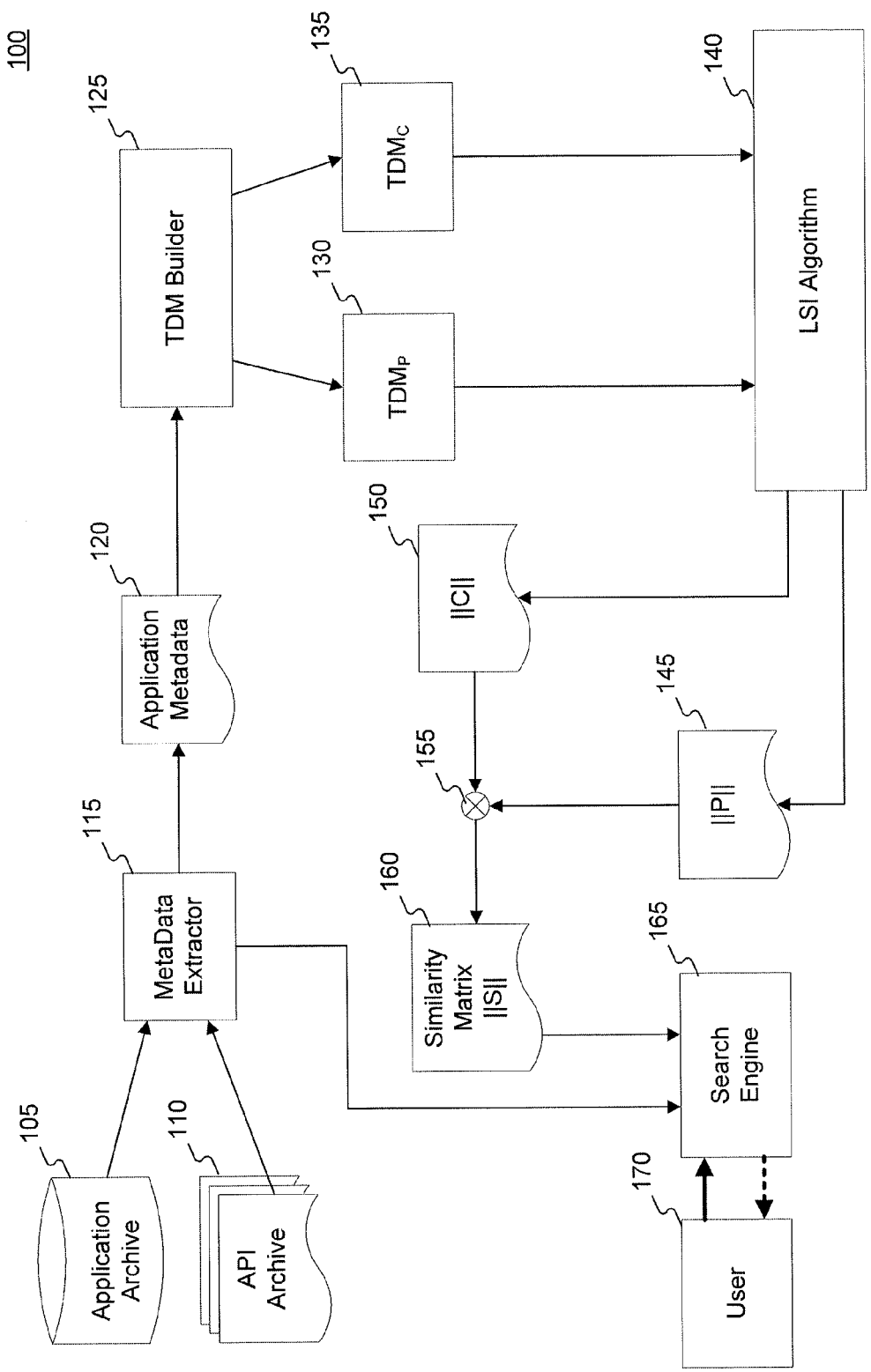
FIG. 1 is an illustration of an exemplary embodiment of the disclosed system.

FIG. 1 illustrates an exemplary system 100 for implementing an embodiment of the present disclosure. In the illustrated embodiment, system 100 receives as inputs an Applications Archive 105 and an archive of API calls 110. The Application archive 105 and API archive 110 are used by a MetaData Extractor 115 to find API calls in various packages and classes used in a particular application. Package API calls may be recognized by their existence in the API archive 110. The MetaData Extractor may match API calls in the API archive 110 to an application's source code. The MetaData extractor 115 produces the Application Metadata 120, which, in an embodiment, is a set of tuples (e.g., <<<package, class>, API call>; Application>) thereby linking API calls and their packages and classes to applications (e.g., Java applications) that use these API calls. The Term-Document Matrix (TDM)

Builder 125 uses the Application Metadata 120 to produce two TDMs: a Package-Application Matrix (TDM$_P$) 130 and Class-Application Matrix (TDM$_C$) 135 that contain a weighted correlation coefficient for Java packages and classes whose API calls are invoked in respective applications.

Although some exemplary embodiments have been described in terms of finding similarities between Java applications, it should be understood that the system may also be used, in some embodiments, to find similarities between applications written in other programming languages. For example, similarities between C++ applications may be found by equating Java's packages to C++'s namespaces and Java's classes to C++'s classes. Other embodiments may use only one TDM to correlate API calls or similar function calls derived from any source. In other embodiments, the system 100 may use other TDMs built using the same concepts as presented herein, but keyed on other metadata found in the programming applications and documentation, such as a TDM based on syntagmatic associations (word matching) or a TDM based on focused syntagmatic associations (keyword matching). In some embodiments, the MetaData Extractor 115 and Applications Metadata 120 may contain processes to cull alternative metadata out of the Application archive 105 for further processing by the TDM Builder 125 to support additional or different TDMs.

In an embodiment, the exemplary system 100 may use Latent Semantic Indexing (LSI) (a well-established conceptual framework of relevance) (step 140), but extend it by including semantic layers that correspond to packages and class hierarchies that contain functional abstractions. This approach is based on the concept that applications that contain functional abstractions in the form of API calls whose semantics are defined precisely and implement the same requirement (e.g., different API calls from a data compression library) have a higher degree of similarity than those that do not have API calls that are related to a requirement. LSI may be applied separately to TDM$_P$ and TDM$_C$ to compute class and package matrices ‖P‖ 145 and ‖C‖ 150, respectively, where each row contains coordinates that indicate the packages (‖P‖) or classes (‖C‖) of API calls that are invoked in the application. Matrices ‖P‖ 145 and ‖C‖ 150 may be combined 155 into a Similarity Matrix 160 using a process described in more detail below. The Similarity Matrix 160, ‖S‖, is a matrix whose rows and columns designate applications. For any two applications A$_i$ and A$_j$, each element of ‖S‖, S$_{ij}$ represents a similarity score between these applications that may be defined as follows:

$$S_{ij} = \begin{cases} 0 \leq s \leq 1, & \text{if } i \neq j \\ 1, & \text{if } i = j \end{cases}$$

Once found, one use of the similarity between applications is in finding existing applications that meet a defined set of requirements. After obtaining the initial set of requirements, the user 170 may enter keywords representing aspects of these requirements into search engine 165, which will return applications relevant to these keywords. The results may also include non-code artifacts, which may be important for the bidding process or to expedite application documentation.

After reviewing the returned applications, the user may determine which code and non-code artifacts are relevant to the requirements, and which artifacts are missing. The user may focus the search to find applications that contain the missing artifacts and which are also similar to relevant applications that the user has already found. Exemplary embodiments may reduce query or document mismatch by expanding the query with concepts that are similar to the set of relevant documents. In this case, the exemplary system 100 may expand the initial query using the previously found application to include artifacts from this application that matched some of the requirements determined by the user, and thus find applications containing artifacts similar to the ones in the found application.

When a user 170 enters a query, it is passed to the Search Engine 165 that retrieves applications with relevancy ranking based on the Similarity Matrix 160. Search Engine 165 uses the Application Metadata 120 to extract and deliver a map of API calls for each pair of similar applications. This map shows API calls along with their classes and packages that are shared by similar applications. The user 170 is allowed to select and view the returned applications' API calls to help determine which project requirements are met. The user may also select to find similar applications to any particular returned application. Upon selection of this option, a new list of applications is returned to the user 170, based on the similarity matrix index.

For example, suppose that a programmer was tasked with creating an application that records musical data from an electronic instrument into a MIDI file. The user may submit a search query that contains key words, such as "record," "MIDI," and "file." The exemplary search engine may retrieve a list of applications that are relevant to these key words. The applications retrieved may include the application "MidiQuickFix" that may be of interest to the user. After clicking on the link corresponding to this application, the exemplary system may present the user with a list of similar applications ranked in descending order. The user may select a relevant similar application, and in response, the system may present the user with a visual interface, as shown in part in FIG. 2.

Figure 2:
FIG. 2 is a more detailed illustration of an exemplary process of building a Term-Document Matrix (TDM) for package API libraries.

The exemplary interface of FIG. 2 shows three tabs. The leftmost tab (the active tab in FIG. 2) presents packages, classes, and API calls common to both applications. The two other tabs present packages, classes, and API calls for each application separately. Comparing applications directly based on functionally related API calls may help programmers to concentrate on highly related details rather than examine the entire source code. In this example, the most similar application retrieved is mbox, a command-line utility to convert MIDI files to mappings of music box drums. Packages com.sun.media.sound and javax.sound.midi are shown in FIG. 2 as common for both applications MidiQuickFix and mbox. When expanded, common classes and API calls are shown to the user. For example, FIG. 2 indicates that the class AbstractMidiDevice includes an API call, doClose, that is invoked in both applications.

Note that this example display of FIG. 2 is not intended to be restrictive. Additional tabs or other delimiters may be included to assist the programmer in comparing two or more applications. For example, the display may include a tab for each application that represents class and package information for each API call not found in each other application. This would help the programmer to understand the differences as well as the similarities between the two applications. In addition, the user interface may contain other elements (such as "breadcrumbs") to make navigation of the search results more convenient for the user. Also, the user interface may allow the user to select and compare similarities and differences among three or more applications.

Returning to FIG. 1, one or more of the components depicted in FIG. 1 may be implemented in software on one or more computing systems. For example, the components may comprise one or more applications, which may in turn comprise one or more units of computer-readable instructions which, when executed by a processor, cause a computer to perform steps of a method. Computer-readable instructions may be stored on a computer-readable medium, such as a memory or disk. Such media typically provide non-transitory storage. One or more of the components depicted in FIG. 1 may be hardware components or combinations of hardware and software such as, for example, special purpose computers or general purpose computers. A computer or computer system may also comprise an internal or external database. The components of a computer or computer system may connect through a local bus interface.

In some embodiments, one or more of the components shown in FIG. 1 may be a computer server with web services enabled. For example, the search engine 165 could contain a processor web service for processing code search requests initiated by users connected via a network using a web browser. The components depicted in FIG. 1 may be operatively connected to one another via a network, not shown, such as the Internet, an intranet, or any type of wired or wireless communication system. Connections may be implemented through a direct communication link, a local area network (LAN), a wide area network (WAN) and/or other suitable connections. Apps Archive 105 and API Archive 110 may be implemented in databases, files, or other suitable repositories and may be accessed by other components directly via an external connection or via a network (not shown).

Figure 3:
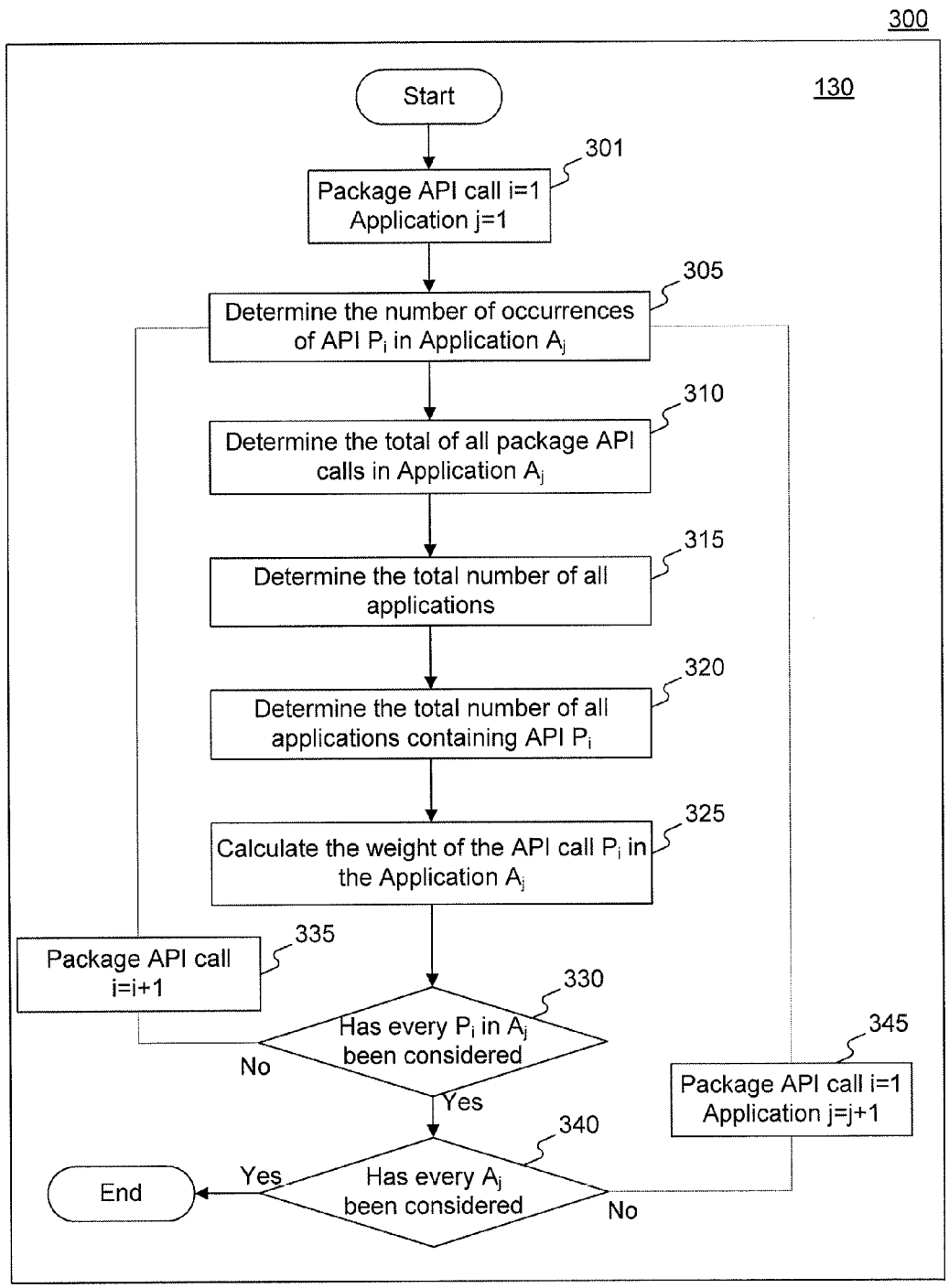
FIG. 3 is a more detailed illustration of an exemplary process of building a Term-Document Matrix (TDM) for class API libraries.

FIG. 3 illustrates an exemplary process 300 used to build the TDM for packages ($TDM_P$). The exemplary process examines each API call i in each eligible Application j found in the Application archive, where j is an index into the Application Archive and i is an index into the package API calls of the j-th Application. To begin, the process 300 assigns one (1) to each of the i and j index. The number of occurrences of package API call i in the application j is determined at step 305 by counting the number of occurrences package API call i appears in Application j. The number of occurrences of all package API calls in Application j is determined at step 310 by counting the number of occurrences all package API calls appear in Application j. The total number of applications is determined at step 315 by counting all of the eligible applications appearing in the Application archive 105. The number of applications that call package API call i is determined at step 320 by counting each eligible application appearing in the Application archive 105 that contains package API call i. The weight for the i-th package API call in the j-th Application ($TDM_{P_{ij}}$) is calculated in step 325 by multiplying the Package Term Frequency ($TF_P$) by the Inverse Document Frequency (IDF).

$TF_P$ represents a normalized measure of the package API call count. The Term frequency for a particular package may be calculated as follows:

$$TF_{ij} = \frac{n_{ij}}{\sum_k n_{kj}},$$

where $n_{ij}$ represents the number of occurrences of the considered package API call $P_i$ in application $A_j$ (determined at Step 305), and $\Sigma_k n_{kj}$ represents the total of all package API calls in application $A_j$ (determined at Step 310).

The Inverse Document Frequency (IDF) is a measure of the general importance of the API call, obtained by dividing the total number of applications by the number of applications containing the API call, and then taking the logarithm of that quotient, $$IDF_i = \log \frac{|A|}{|\{a: P_i \in A\}|},$$

where $|A|$ is the total number of applications (determined at step 315) and $|\{a:P_i \epsilon A\}|$ is the number of applications where the package API call $P_i$ appears (determined at step 320).

The resulting weight is computed for $TDM_{P_{ij}}$, as follows:

$$TDM_{P_{ij}} = TFIDF_{ij} = TF_{ij} \times IDF_i \text{ (determined at Step 325)}.$$

Once the weight is found for $TDM_{P_{ij}}$ the process 300 considers at step 330 whether all package API calls in Application j have been considered. If not, then the i index is incremented in step 335 and the process returns to step 305. If so, then the process 300 considers at step 340 whether all eligible applications have been considered. If not, then the j index is incremented and i index set to one (1) in step 345 and the process returns to step 305 for further processing. If so, then the process ends.

The set of $TDM_{P_{ij}}$ values found in exemplary process 300 define the $TDM_P$, where each row corresponds to a unique package API call and each column corresponds to a unique application found in the Application Archive 105.

The exemplary process 300 may use the Application Meta-Data 120 to help determine the data determined in steps 305, 310, 315, and 320, because the Application MetaData already contains associations of package or class API calls to Applications.

Each element of the resulting $TDM_P$ may represent a normalized metric, determined from the process 300, that represents how frequently this package API call (row) is used in this application (column), but tempered by the relative importance of the package API call in the application. A simple metric like the API call count, alone—showing the number of times a given API call appears in applications regardless of any context—may be subject to bias, thereby skewing the distribution of these calls toward large applications, which may have a higher API call count regardless of the actual importance of that API call. Therefore, a normalized metric, such as the one presented by the exemplary process 300, may reduce bias by accounting for the total number of API calls in the particular application and correlating it to the general importance of a particular API call in all applications. API calls that are used less frequently across all applications will, in general, be more important to determine similarity than API calls used in nearly every application.

Figure 4:
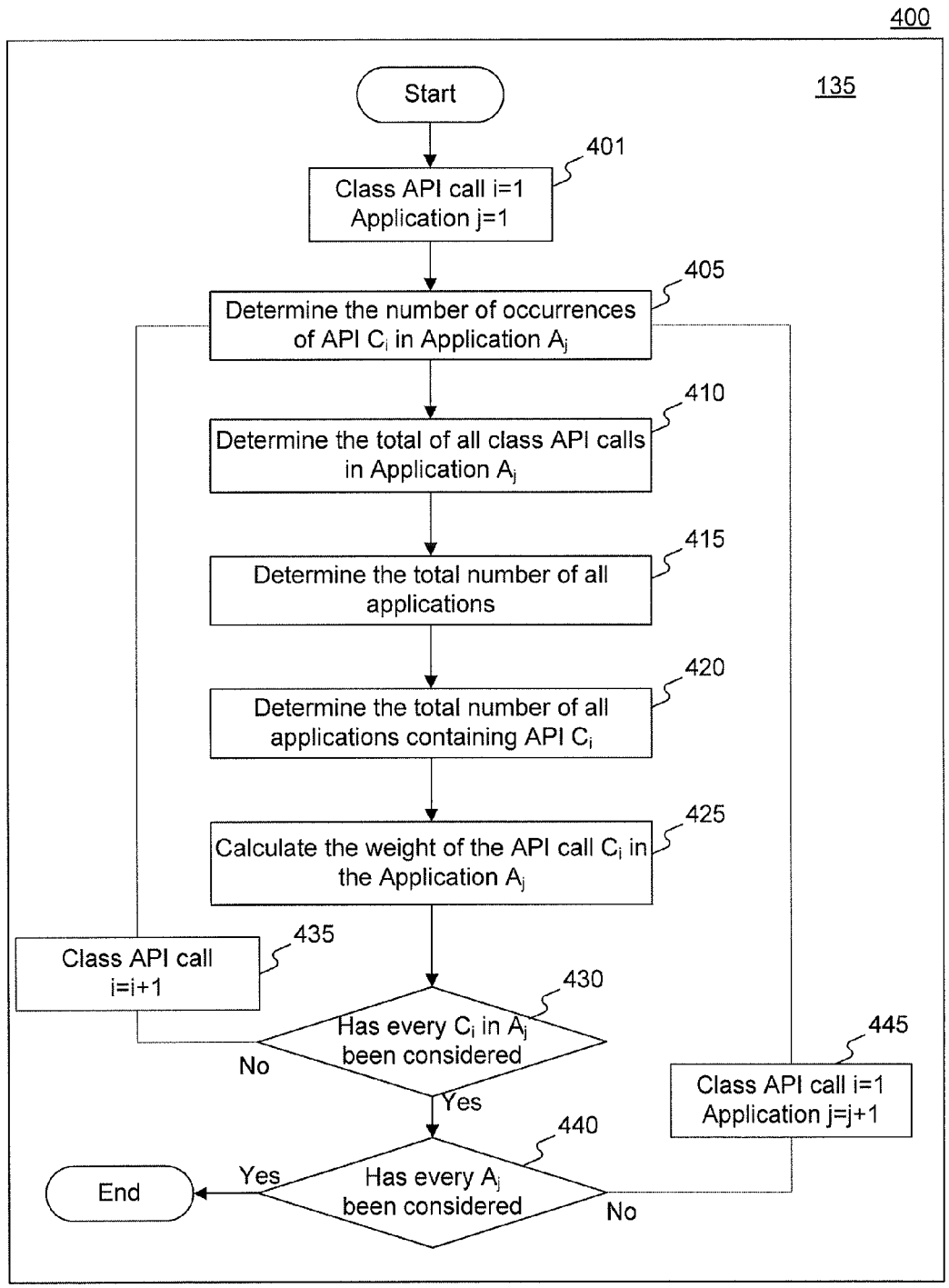
FIG. 4 is an illustration of an exemplary method for breaking down a Term-Document Matrix (TDM) into three matrices.

FIG. 4 illustrates an exemplary process 400 used to build the TDM for classes ($TDM_C$). The exemplary process 400 mirrors the process 300 for calculating the $TDM_P$. As such, the discussion above, with respect to determining the $TDM_P$ may be altered by a person of ordinary skill to achieve the $TDM_C$. Specifically each of steps 401, 405, 410, 415, 420, 425, 430, 435, 440, and 445 mirrors steps 301, 305, 310, 315, 325, 330, 335, 340, and 345, respectively, but with respect to class API calls, not package API calls. Therefore, one of ordinary skill may look to the discussion above with respect to process 300 to understand process 400.

TDMs for other semantic anchors, syntagmatic associations, or for other programming languages may be developed in a similar way.

Figure 5:
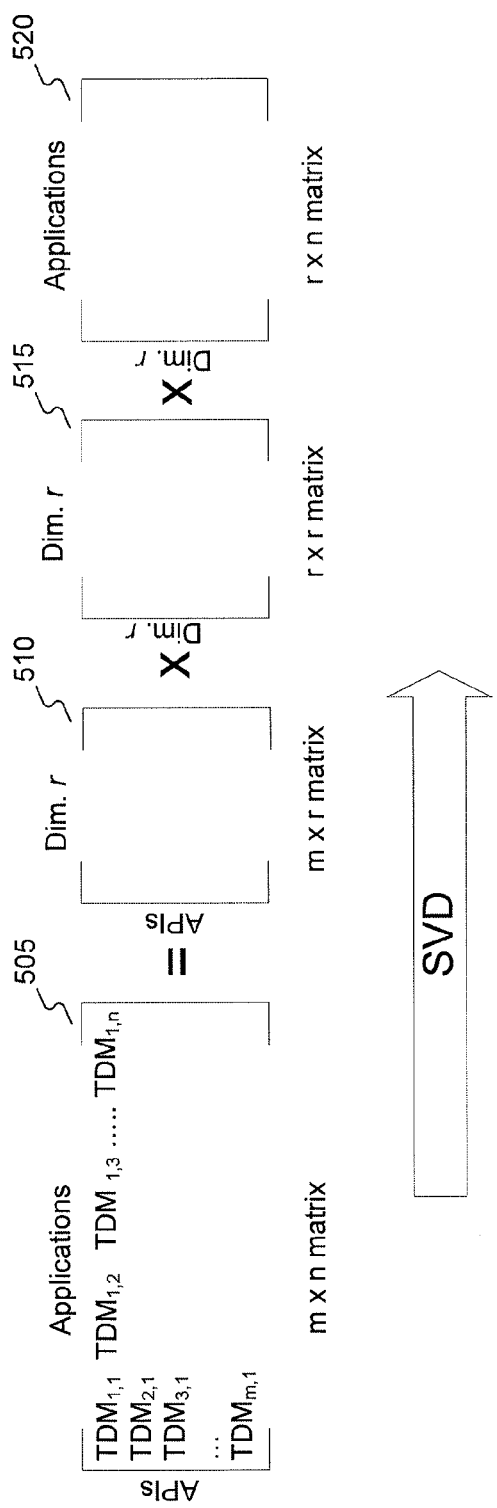
FIG. 5 is a more detailed illustration of an exemplary method for finding a reduced dimension of application vectors.

FIG. 5 illustrates how Latent Symantec Indexing (LSI) uses singular value decomposition (SVD) to break the $TDM_P$ and $TDM_C$ 505 into a set of three matrices. LSI reduces the dimensionality of the similarity space while simultaneously revealing latent concepts that are implemented in the underlying corpus of applications. In LSI, terms are elevated to an abstract space, and terms that are used in similar contexts are considered similar even if they are spelled differently. Thus, LSI makes embedded concepts explicit. SVD is a form of factor analysis used to reduce dimensionality of the space to capture most essential semantic information. SVD can be viewed as a method for rotating the coordinate axes of the r-dimensional space to align these axes along the directions of largest variations among the documents. As a result, LSI offers a way of assessing semantic similarity between any two samples of some text.

SVD decomposes $TDM_P$ and $TDM_C$ 505 into three matrices using a reduced number of dimensions, r, whose value may be chosen experimentally. The number of dimensions is commonly chosen to be r=300, but may be greater or less than 300. Three exemplary decomposed matrices are shown on the right-hand side of the schematic equation 500 in FIG. 4. The first matrix 510 contains term vectors describing the relative weights that terms (e.g., classes or packages that contain API calls found in applications) have for different dimensions. The second matrix 515 contains scaling factors, and the third matrix 520 contains application vectors describing the relative weights that applications have for different dimensions. Each column in the third matrix 520 is a vector whose elements specify coordinates for a given application in the r-dimensional space. Similarities between applications may be determined by computing the cosines between vector rows of the third matrix 520. One of ordinary skill will understand that other methods of calculating and expressing the angular similarity between the vector rows may also be used to determine the similarities between applications.

Figure 6:
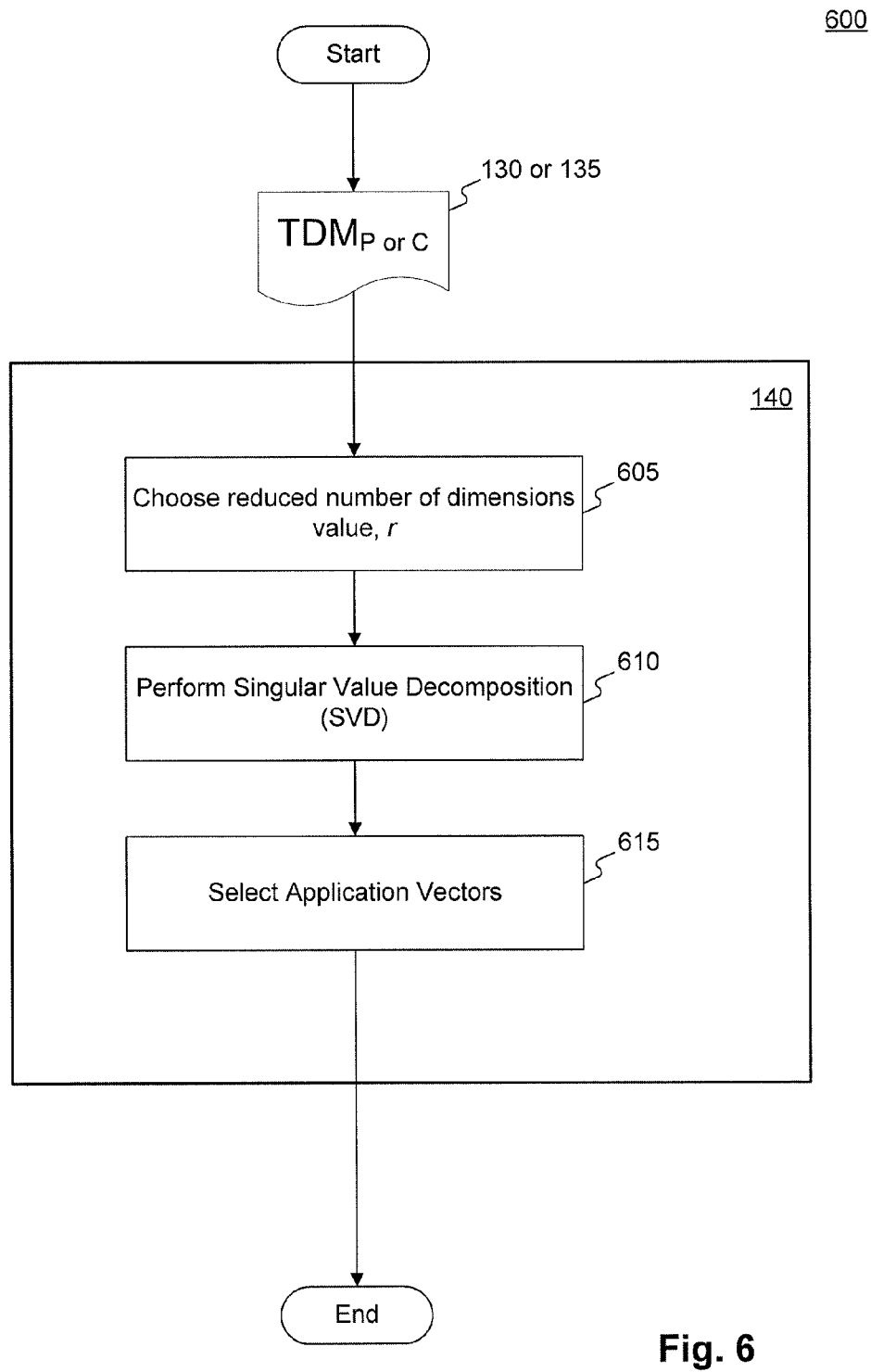
FIG. 6 is a more detailed illustration of an exemplary process to find an similarity matrix.

FIG. 6 contains an exemplary illustration of how ||P|| 145 and ||C|| 150 are calculated using LSI. The exemplary process 600 chooses a reduced number of dimensions, r (step 605). Using SVD, the $TDM_P$ and $TDM_C$ are decomposed into the matrices as described above in regard to FIG. 5 (step 610). The right most matrix of FIG. 5, the set of application vectors, is selected as ||P|| and ||C||, respectively (step 615).

As mentioned above, r may be experimentally chosen, but an effective number for r is 300. Increasing r will result in finding more similar applications (requiring less semantic similarities to determine that an application is similar), while reducing r will result in fewer similar applications (requiring more semantic similarities to determine that an application is similar). Therefore, while r may theoretically be any number, the user will likely find better results in choosing an r in the 100 to 500 range. One factor that may influence the r chosen is the number of applications in the pool. Note that if the r value changes, then the decomposition matrices may have to be recalculated.

Note that the concepts presented herein are not dependent on the use of LSI to correlate the API calls with applications. This correlation may occur by other data abstraction means. For example, another means of finding a correlation is through a Vector Space Model (VSM). In a VSM, documents are represented as vectors of words and a similarity measure is computed as the cosine between these vectors. Typically, a VSM is used to find syntagmatic associations, such as word similarities between documents.

In an embodiment, VSM techniques may be applied to determine similarity between two programs. First, VSM may consider the source code and documentation content of the two programs. Second, for each program, VSM may filter everything but the package and class API calls, providing a semantic representation of the program. (In a traditional VSM, all identifiers, language keywords, comments, API calls are words without any semantics.) Third, VSM may represent these programs as vectors of the API calls. Fourth, VSM may determine similarity by computing the cosine between these vectors. Filtering out words other than the API calls solves the problem where different programmers can use the same words to describe different requirements (the synonymy problem) and where different programmers can use different words to describe the same requirements (the polysemy problem). Keeping only the API calls also solves the more general vocabulary problem, which holds that no single word can be chosen to describe a programming concept in the best way. Because API calls from the JDK have precise meanings, this modified VSM approach addresses the polysemy, synonymy, and vocabulary problems.

In some embodiments, traditional VSM techniques may be further altered to reduce some of the bias as discussed above with regard to LSI. Because a majority of applications use API calls from collections and string manipulation classes; finding two applications similar only because they share many of such API calls may be imprecise. In addition, the sheer number of possible API calls suggests that many of these calls are likely to be shared by different programs that implement completely different requirements. Therefore, in some embodiments, the VSM may be modified to filter out the more common API calls. Common API calls may be found by a process similar to the Inverse Document Frequency calculation discussed above with respect to step 325 of process 300.

In addition, the JDK contains close to 115,000 API calls that are exported by a little more than 13,000 classes and interfaces that are contained in 721 packages. LSI reduces the dimensionality of this space while simultaneously revealing similarities between latent high-level requirements. Because VSM does not itself reduce the dimensionality of the vector-space (though it was reduced through the filtering as discussed above), it may be computationally infeasible to calculate similarities using VSM for some application archives.

Figure 7:
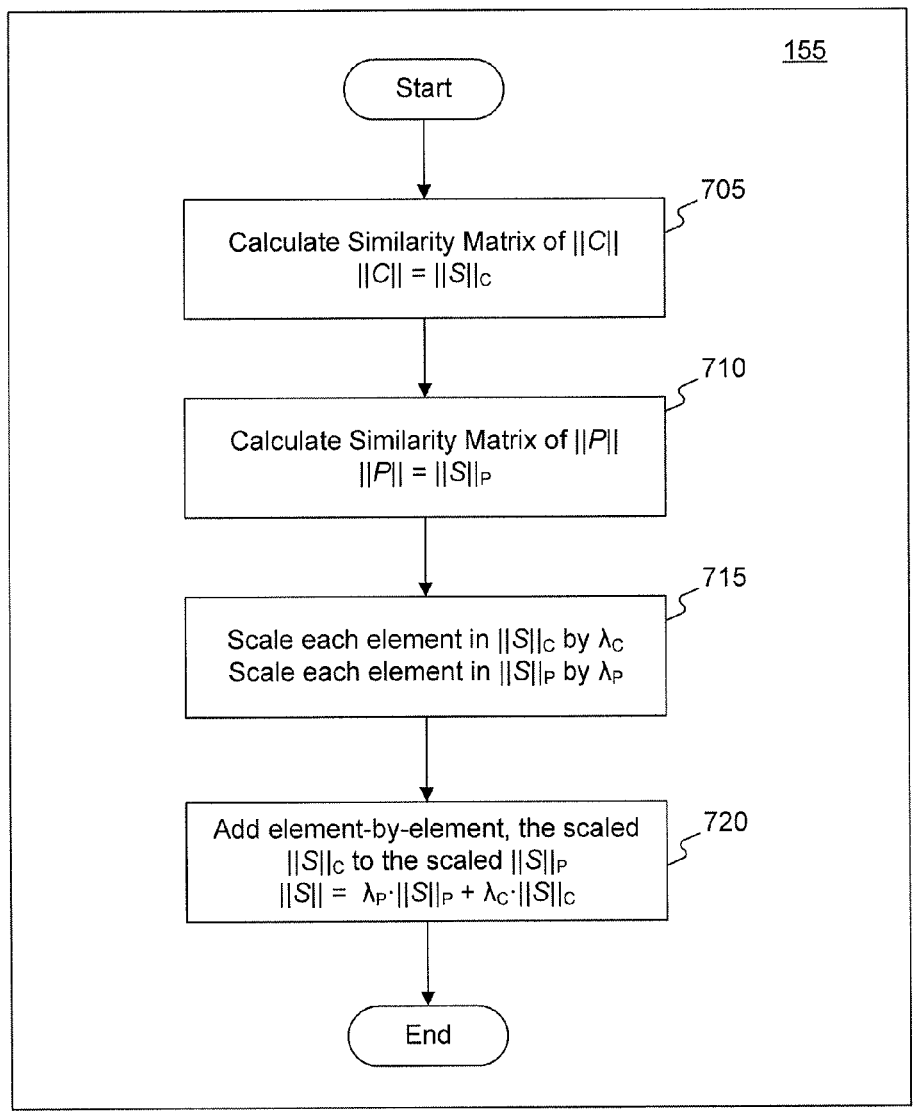
FIG. 7 is an exemplary illustration of a user interface for showing similarity between applications.

FIG. 7 illustrates an exemplary process 700 to calculate the similarity matrix 160. The process 700 calculates the similarity matrix of ||C||, $||S||_C$ 705, the similarity matrix of ||P||, $||S||_P$ 710, scales each element in each similarity matrix by a interpolation weight in step 715, and then combines them in step 720 on an element-by-element basis to calculate the final similarity matrix, ||S||.

In an embodiment, Matrices ||P|| 145 and ||C|| 150 may be combined by matrix operator 155 into the Similarity Matrix 160 using the following formula $||P||=\lambda_C \cdot ||S||_C + \lambda_P \cdot ||S||_P$, where $\lambda$ is the interpolation weight for each similarity matrix, and matrices $||S||_C$ and $||S||_P$ are similarity matrices for ||C|| and ||P||, respectively. As described above, these similarity matrices may be obtained by computing the cosine between the vector for each application (a corresponding column in the matrix 520) and vectors for all other applications. Thus, $||S||_C$ and $||S||_P$ are each matrices of n×n dimensions where n is the number of eligible Applications found in the Application Archive 105. Weights $\lambda_P$ and $\lambda_C$ may be determined independently of applications. Adjusting these weights allows for experimentation with how underlying structural and textual information in an application affects resulting similarity scores. In an embodiment, $\lambda_P=\lambda_C=0.5$, so that both class and package-level similarity scores contribute equally to the Similarity Matrix. However, class-level and package-level similarities may be different because applications are often more similar on the package level than on the class level, reflecting the fact that there are fewer packages than classes in the JDK. Therefore, there is a higher probability that two applications may have API calls that are located in the same package but not in the same class. Using this knowledge, one of ordinary skill may experimentally adjust the weighting coefficients, $\lambda_P$ and $\lambda_C$, as needed to achieve the best result for a given data set.

Turning back to FIG. 1 and FIG. 2, using the similarity matrix, in an embodiment, the system 100 allows a user 170 to search for an application based on an input and to use those results through an interface to find similar applications and display details on the interface as in FIG. 2.

Other embodiments of the disclosure will be apparent to those skilled in the art from consideration of the specification and practice of the embodiments disclosed herein. It is intended that the specification and examples be considered as exemplary only, with a true scope and spirit of the embodiments being indicated by the following claims.

What is claimed is:

1. A system, comprising:
a computer including:
a non-transitory memory device storing instructions and a similarity matrix, the similarity matrix combining:
a first categorization matrix defining a similarity between computer applications in a plurality of computer applications according to a first categorization of computer program calls,
a second categorization matrix defining a similarity between the computer applications according to a second categorization of the computer program calls, and
wherein the computer program calls are defined hierarchically and the first categorization corresponds to a first level of a hierarchy and the second categorization corresponds to a second level of the hierarchy; and
a processor that executes the instructions, causing the computer to:
receive a selection of one of the plurality of computer applications, and
indicate at least one of the plurality of computer applications
using the stored similarity matrix and based on the selected one of the plurality of computer applications.

2. The system of claim 1, wherein the first categorization matrix defines the similarity between computer applications as a numerical value based on computer program calls in source code of the computer applications.

3. The system of claim 1, wherein the first categorization matrix is generated from a term document matrix using singular value decomposition, the term document matrix including columns corresponding to the computer applications and rows corresponding to categories of the first categorization.

4. The system of claim 3, wherein elements of the term document matrix have values based on a number of computer program calls in a computer application corresponding to the column and in the category corresponding to the row, at least one of the computer program calls corresponding to one of the categories.

5. The system of claim 4, wherein the elements of the term document matrix have values weighted by
the number of computer program calls in the computer application corresponding to the column, and
a number of computer applications in the plurality of computer applications that contain computer program calls in the category corresponding to the row.

6. The system of claim 1, wherein the second categorization matrix is generated from a plurality of vectors corresponding to the computer applications in the plurality of computer applications using a vector space model, the plurality of vectors including elements corresponding to categories of the second categorization, the elements including values based on a number of computer program calls in source code and documentation for a computer application corresponding to a vector and in the category corresponding to an element, at least one of the computer program calls corresponding to one of the categories.

7. The system of claim 1, wherein the hierarchy is an inheritance hierarchy.

8. The system of claim 1, wherein the first level of the hierarchy includes Java packages and the second level of the hierarchy includes Java classes.

9. The system of claim 1, wherein the first level of the hierarchy includes C++ namespaces and the second level of the hierarchy includes C++ classes.

10. The system of claim 1, wherein the computer program calls are API calls.

11. The system of claim 1, wherein the computer generates the stored similarity matrix.

12. The system of claim 10, wherein the computer receives the plurality of computer applications from a computer application archive over a network.

13. A system for determining similar computer applications, comprising:
one or more memories to store a plurality of computer applications;
one or more processor to implement:
a metadata extractor configured to receive the plurality of computer applications from the memory and to generate tuples associating at least one of the plurality of computer applications with computer program calls, the computer program calls being defined hierarchically with a first categorization corresponding to a first level of a hierarchy and a second categorization corresponding to a second level of the hierarchy;
a term document matrix builder configured to receive the tuples
and to generate a first term document matrix according to the first categorization and a second term document matrix according to the second categorization;
a similarity matrix builder configured to receive the first term document matrix and the second term document matrix and to generate a similarity matrix using singular value decomposition of the
first term document matrix and the second term document matrix; and
a search engine configured to receive a selection of one of the plurality of computer applications and provide an indication of at least
one of the computer applications using the similarity matrix and based on the selected one of the plurality of computer applications.

14. The system of claim 13, wherein the tuples comprise:
an indication of one of the plurality of computer applications,
an indication of one of the computer program calls,
an indication of a category of the first categorization encompassing the one of the computer program calls, and
an indication of a category of the second categorization encompassing the one of the computer program calls.

15. The system of claim 13, wherein the metadata extractor generates the tuples from source code of computer applications in the plurality of computer applications.

16. The system of claim 13, wherein the first term document matrix includes columns corresponding to computer applications in the plurality of computer applications, rows corresponding to categories of the first categorization, and elements of the term document matrix have values based on a number of computer program calls in a computer application corresponding to a column and in a category corresponding to a row, at least one of the computer program calls corresponding to one of the categories.

17. The system of claim 13, wherein the hierarchy is an inheritance hierarchy.

18. The system of claim 13, wherein the first level of the hierarchy includes Java packages and the second level of the hierarchy includes Java classes.

19. A method comprising:
generating a similarity matrix using a computer server, comprising:
receiving a plurality of computer applications from a computer application database,
generating tuples associating at least one of the plurality of computer applications with computer program calls, categories of a first categorization, and categories of a second categorization, wherein the computer program calls are defined hierarchically, the first categorization corresponding to a first level of the hierarchy and the second categorization corresponding to a second level of the hierarchy,
generating, based on the tuples, a first term document matrix according to the first categorization and a second term document matrix according to the second categorization, and
generating the similarity matrix from the first term document matrix and the second term document matrix, elements of the similarity matrix indicating a similarity between computer applications
corresponding to rows of the similarity matrix and computer applications corresponding to columns of the similarity matrix; and
providing an indication of relevant computer applications using the computer server, comprising:
providing a web service for processing code search requests,
indicating first relevant computer applications based on a code
search request, and
indicating second relevant computer applications using the similarity matrix based on a selection of one of the first relevant computer applications.

20. The method of claim 19, wherein indicating the second relevant computer applications comprises:
determining computer program calls shared by one of the second relevant computer applications and the selected one of the first relevant computer applications, and
providing instructions to display the shared computer program calls.

* * * * *